United States Patent
King

(10) Patent No.: US 9,222,517 B1
(45) Date of Patent: Dec. 29, 2015

(54) TAPERED BEARING SYSTEM TO MINIMIZE SHAFT DAMAGE AND COMPONENT FAILURE

(71) Applicant: Bradford Christopher King, Langley, WA (US)

(72) Inventor: Bradford Christopher King, Langley, WA (US)

( * ) Notice: Subject to any disclaimer, the term of this patent is extended or adjusted under 35 U.S.C. 154(b) by 0 days.

(21) Appl. No.: 14/555,207

(22) Filed: Nov. 26, 2014

(51) Int. Cl.
| F16C 19/38 | (2006.01) |
| F16C 25/08 | (2006.01) |
| F16C 35/063 | (2006.01) |
| F16C 19/36 | (2006.01) |
| F16C 33/58 | (2006.01) |
| B23Q 1/28 | (2006.01) |

(52) U.S. Cl.
CPC ............. *F16C 35/063* (2013.01); *F16C 19/364* (2013.01); *F16C 33/583* (2013.01); *B23Q 1/28* (2013.01)

(58) Field of Classification Search
CPC .... F16C 19/385; F16C 33/583; F16C 33/585; F16C 33/605; F16C 35/666; F16C 35/042; F16C 35/063; B23Q 1/28; F16B 39/106
USPC ......... 384/513, 516, 551, 559, 563, 565, 571, 384/584–586; 411/120, 122, 197
See application file for complete search history.

(56) References Cited

U.S. PATENT DOCUMENTS

| 1,851,561 | A | * | 3/1932 | Baninger | 384/536 |
| 2,407,532 | A | | 9/1946 | Boden | |
| 2,657,104 | A | * | 10/1953 | Kayser | 384/486 |
| 3,131,484 | A | * | 5/1964 | Storch | 33/600 |
| 3,156,506 | A | * | 11/1964 | Scheifele et al. | 384/589 |
| 3,326,613 | A | * | 6/1967 | Renker | 384/493 |
| 3,436,134 | A | * | 4/1969 | Gordon | 384/563 |
| 3,578,829 | A | * | 5/1971 | Hata et al. | 384/458 |
| 3,746,412 | A | * | 7/1973 | Hay | 384/563 |
| 3,804,562 | A | * | 4/1974 | Hansson | 418/107 |
| 3,901,568 | A | * | 8/1975 | Gadd et al. | 384/589 |
| 3,943,803 | A | * | 3/1976 | Hafla | 384/563 |
| 4,173,376 | A | * | 11/1979 | Standing et al. | 384/517 |
| 5,221,168 | A | * | 6/1993 | Kasai | 411/124 |
| 5,411,335 | A | * | 5/1995 | Driver | 384/448 |
| 5,571,004 | A | * | 11/1996 | Masters et al. | 418/107 |
| 5,624,193 | A | * | 4/1997 | Vogelsberger et al. | 384/517 |
| 5,785,434 | A | * | 7/1998 | Rode | 384/563 |
| 6,312,162 | B1 | | 11/2001 | Castle | |
| 6,540,406 | B1 | * | 4/2003 | Matsuoka | 384/517 |
| 6,935,788 | B2 | * | 8/2005 | Stanczak | 384/551 |
| 6,971,802 | B2 | * | 12/2005 | Vezina | 384/517 |
| 6,976,816 | B2 | * | 12/2005 | Slesinski et al. | 411/122 |
| 8,136,997 | B2 | * | 3/2012 | Rivett et al. | 384/551 |
| 8,393,799 | B2 | * | 3/2013 | Dahl | 384/569 |
| 2006/0231336 | A1 | * | 10/2006 | Crawford | 184/5.1 |
| 2014/0259673 | A1 | * | 9/2014 | Ebert | 29/898.07 |

* cited by examiner

*Primary Examiner* — Marcus Charles
(74) *Attorney, Agent, or Firm* — Plager Schack LLP

(57) ABSTRACT

A roller bearing system for use with a rotating shaft remains locked to the shaft during thermal expansion and vibrations generated by the rotating shaft. The system includes a first bearing assembly with a first bearing cone connected to the shaft, a tubular member disposed around the shaft and positioned against the first bearing assembly, a disc spring assembly connected to the shaft and positioned between the tubular member and a clearance ring, a second bearing assembly with a second bearing cone connected to the shaft and positioned against the clearance ring, and a locking assembly connected to the shaft and positioned against the second bearing assembly. The locking assembly rotatably adjusts to exert sufficient pressure to lock the first bearing cone to the shaft and enable the disc spring assembly to generate a compression force to lock the second bearing cone to the shaft.

8 Claims, 2 Drawing Sheets

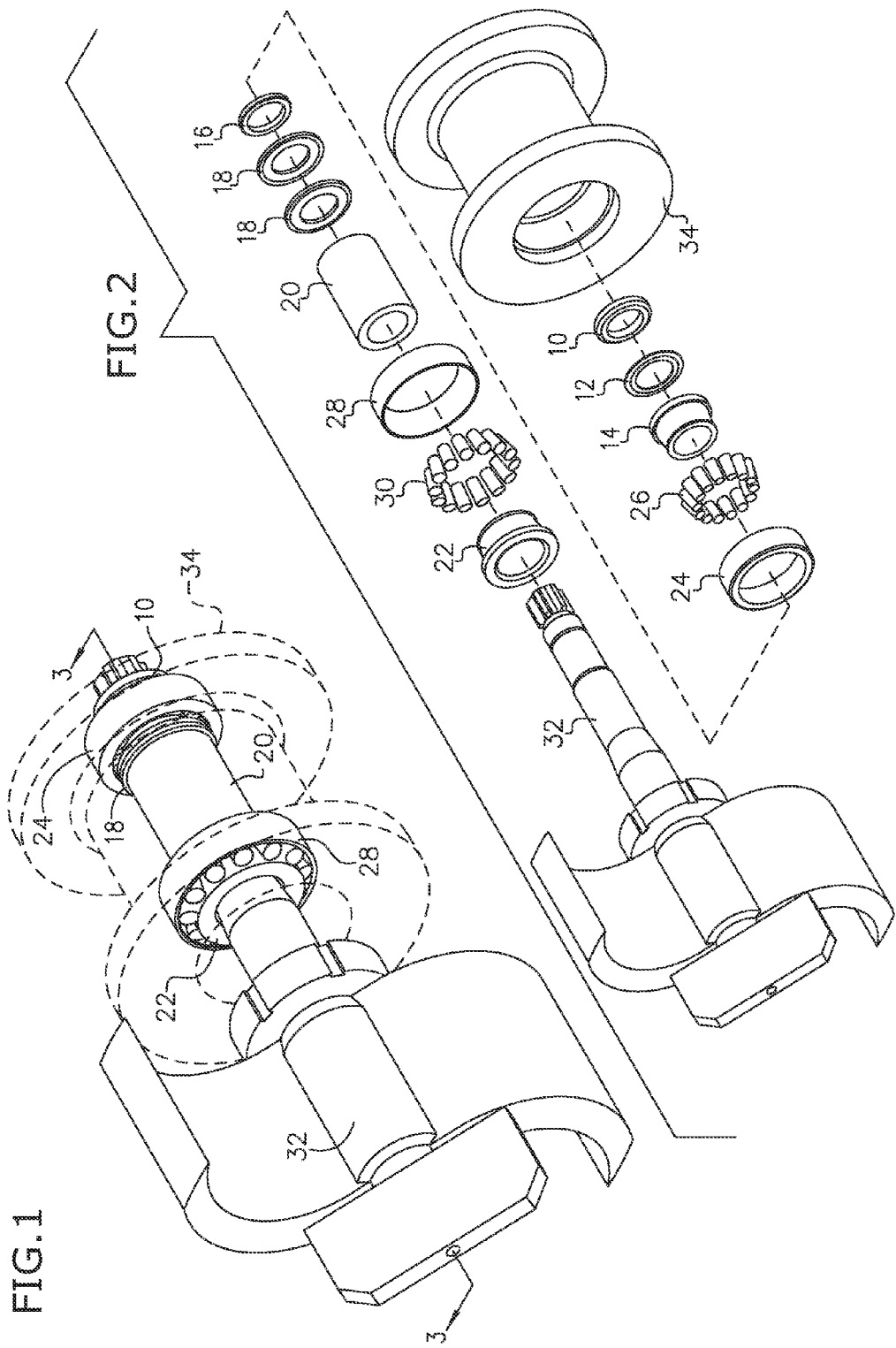

FIG.3
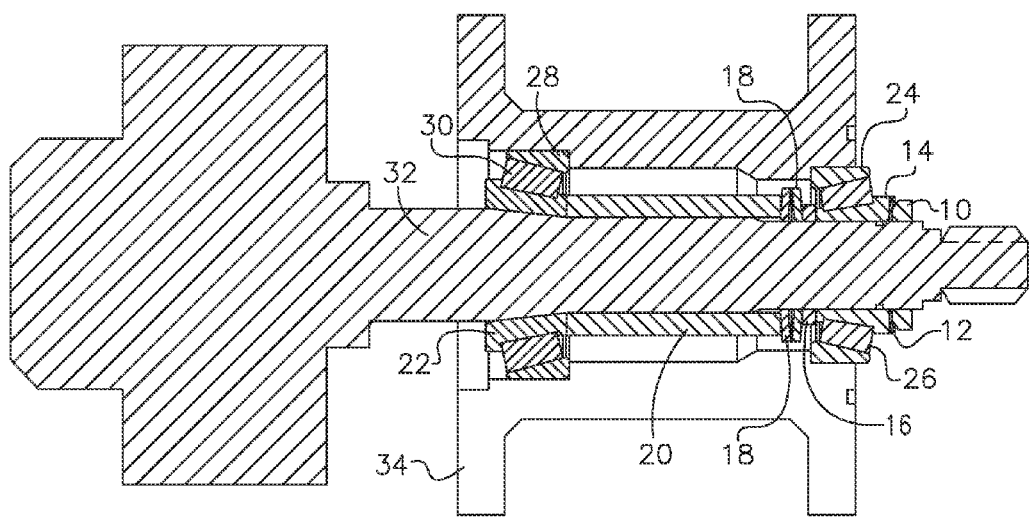
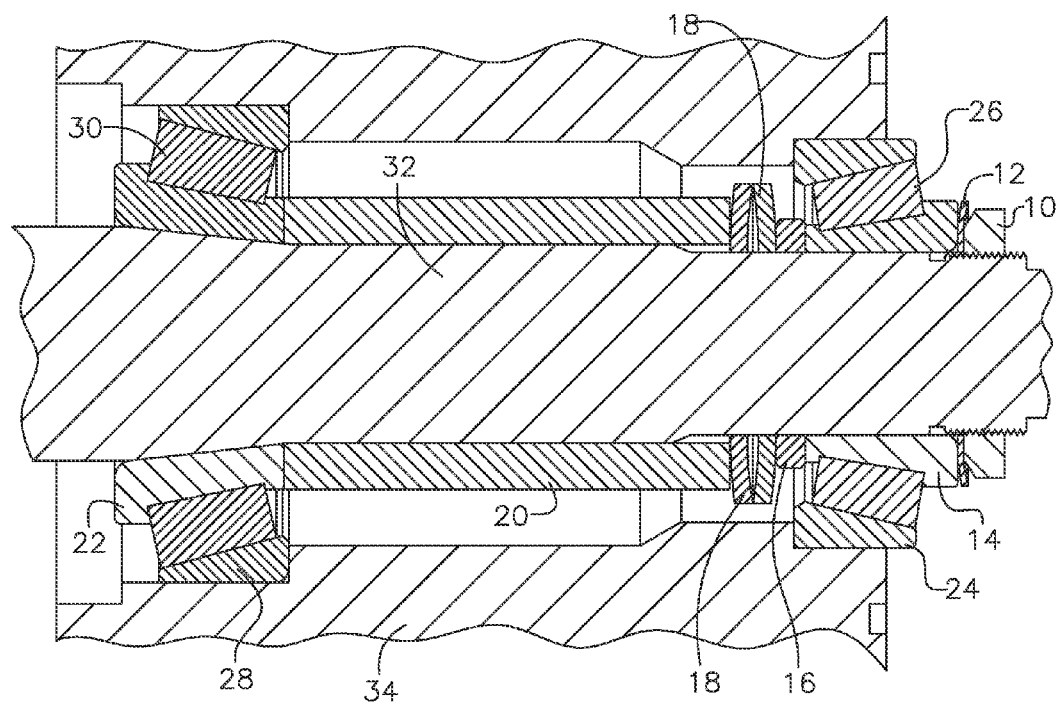
FIG.4

TAPERED BEARING SYSTEM TO MINIMIZE SHAFT DAMAGE AND COMPONENT FAILURE

BACKGROUND

The embodiments herein relate generally to bearing systems used on rotating shafts.

Rotating shafts are used in a wide variety of applications including, but not limited to, pumps, turbines, engines, pulp mills, garbage shredders, wood choppers, hammer mills, vehicles and other machines. Typically, the shaft is connected to a set of bearings that enable the shaft to rotate freely. When assembling a bearing and shaft system, spacing between bearings are set to a desired distance apart on the shaft.

Several existing components are used to secure roller bearings to a shaft and allow a space adjustment between bearings, as disclosed in U.S. Pat. No. 6,312,162 issued to Castle and U.S. Pat. No. 2,407,532 issued to Boden. Castle discloses the use of shims or spacers to set the distance between tapered bearings. In particular, an adjustable spacer is disclosed that allows for multiple spacing adjustments between bearings. However, these spacers are limited because they are ineffective in the presence of extreme operating conditions such as thermal expansion of the shaft, and shock loads or vibrations generated from rotating components. Under these conditions, a bearing loosens from the shaft and causes premature wear and/or damage to the shaft or bearing components. In addition, one bearing and the adjustable spacer must be removed for each subsequent bearing clearance adjustment that occurs during normal wear and tear of the system. This could be time consuming and impractical in some system designs. Boden discloses a bearing mounting system that uses a spacer to permit an adjustment of a loosely mounted bearing member relative to a rigidly mounted bearing. However, these components are subject to the same premature wear and failure as described above. In addition, the rigidly mounted bearing is disadvantageous because it requires the member to be press fitted to the shaft. This is a burden to the user because complex tools and/or skills are required to assemble the bearing system. This burden of press fitting a bearing also limits the design variations available to the industry.

As such, there is a need in the industry for a bearing system that effectively locks the bearings to the shaft and maintains a temperature related clearance between the bearings during thermal expansion of the shaft and vibrations or shock loads generated by rotating components.

SUMMARY

A roller bearing system for use with a rotating shaft secured within a housing is provided. The bearing system is configured to remain locked to the shaft during thermal expansion and vibrations generated by the rotating shaft to minimize shaft damage and component failure. The bearing system comprises a first bearing assembly comprising a first bearing cone operably connected to the shaft, a tubular member disposed around the shaft and positioned against the first bearing assembly, a disc spring assembly operably connected to the shaft and positioned between the tubular member and a clearance ring, a second bearing assembly comprising a second bearing cone operably connected to the shaft and positioned against the clearance ring, and a locking assembly operably connected to the shaft and positioned against the second bearing assembly, wherein the locking assembly is configured to rotatably adjust to exert sufficient pressure to lock the first bearing cone to the shaft and enable the disc spring assembly to generate a compression force to exert frictional pressure between the clearance ring and the locking assembly to lock the second bearing cone to the shaft.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a perspective view of certain embodiments of the tapered bearing system;

FIG. 2 depicts an exploded view of certain embodiments of the tapered bearing system;

FIG. 3 depicts a section view of certain embodiments of the tapered bearing system taken along line 3-3 in FIG. 1; and FIG. 4 depicts a section view of certain embodiments of the tapered bearing system.

DETAILED DESCRIPTION OF CERTAIN EMBODIMENTS

As depicted in FIGS. 1-2, the tapered bearing system is configured for use with shaft 32 within housing 34. In a preferred embodiment, shaft 32 is made from ASTM 304L stainless steel and comprises a bottom cylindrical portion that extends to a tapered portion, which extends to a second cylindrical portion with a smaller diameter than the diameter of the bottom cylindrical portion. The second cylindrical portion of shaft 32 extends to an upper shaft portion with a series of threads and a drive spline on the top shaft end. The drive spline comprises a plurality of equally spaced slots oriented perpendicularly to the longitudinal axis of shaft 32. The drive spline is configured to be connected to a motor shaft (not shown), which can be driven by a motor to rotate shaft 32. It shall be appreciated that shaft 32 may be used in any variety of machines in any application such as impellers, turbines, engines or other machines.

The tapered bearing system comprises a first bearing assembly comprising first bearing cone 22, first set of bearing rollers 30 and first bearing outer race 28. First bearing cone 22 is made from high-carbon steel and comprises a 2½ inch per foot tapered bore that is configured to be secured around the tapered portion of shaft 32. The first set of bearing rollers 30 is disposed on the outer surface of first bearing cone 22. First bearing outer race 28 is disposed around the first set of bearing rollers 30 and secured to housing 34. Bearing rollers 30 and bearing outer race 28 may be any type known in the field.

Tube 20 is disposed around shaft 32 and positioned against first bearing cone 22. Tube 20 may be made from any material known in the field such as carbon steel. As depicted in FIGS. 3-4, a pair of disc springs 18 made from carbon steel are placed around shaft 32 and positioned such that a first disc spring 18 is placed against tube 20 and the second disc spring 18 is positioned against the first disc spring 18. Disc springs 18 are belleville washers that each comprises a concave side. Disc springs 18 are oriented such that the concave side of the first disc spring 18 contacts the concave side of the second disc spring 18. It shall be appreciated that any alternative number of paired disc springs 18 may be stacked together and positioned on shaft 32 to modify the compression force that may be generated.

Clearance ring 16 is disposed around shaft 32 and positioned against the second disc spring 18. A second bearing assembly comprising second bearing cone 14, second set of bearing rollers 26 and second bearing outer race 24 is secured around shaft 32 and positioned against clearance ring 16.

Second bearing cone 14 is made from high-carbon steel and comprises a cylindrical bore that is configured to be secured around the second cylindrical portion of shaft 32. The second set of bearing rollers 26 is disposed on the outer surface of second bearing cone 14. Second bearing outer race 24 is disposed around the second set of bearing rollers 26 and secured to housing 34. Bearing rollers 26 and bearing outer race 24 may be any type known in the field. It shall be appreciated that clearance ring 16 creates sufficient space to prevent the second disc spring 18 from contacting the rotating second set of bearing rollers 26 when shaft 32 rotates. The length of clearance ring 16 is sized to compress the discs to roughly 60% spring deflection, sized allowing ample adjustment range to concurrently obtain a nominal axial bearing clearance equal to, but not limited to, (the diameter of shaft 32 at second bearing cone 14)×0.002 at 60% spring deflection.

A locking mechanism comprising lock nut 10 and lock washer 12 is disposed around the upper threaded portion of shaft 32. As depicted in FIGS. 3-4, lock washer 12 is positioned against second bearing cone 14 and lock nut 10 is positioned against lock washer 12. Lock washer 12 is a flat washer that comprises a plurality of bendable tabs disposed along the outer rim of the washer. Lock nut 10 is a castellated nut comprising a plurality of outer slots and a central threaded opening that is configured to engage with the threaded portion of shaft 32. Once lock nut 10 is tightened against second bearing cone 14, the tabs of lock washer 12 are configured to bend into any one of the slots in lock nut 10. In a preferred embodiment, lock washer 12 comprises fifteen outer rim bendable tabs, (with one internal tab engaging a shaft key slot), and lock nut 10 comprises four slots. However, alternative numbers of tabs and/or slots may be used instead.

In operation, components of the tapered bearing system are assembled on shaft 32 as described above. A hand wrench or spanner wrench is used to tighten lock nut 10 towards lock washer 12. As lock nut 10 is tightened, lock washer 12, second bearing cone 14, clearance ring 16, disc springs 18 and tube 20 slide closer together. Second bearing cone 14 can slide along shaft 32 because it has a cylindrical bore with a diameter that matches the second cylindrical portion of shaft 32. First bearing cone 22 cannot slide along shaft 32 because it has a tapered bore that fits around and against the tapered portion of shaft 32. Lock nut 10 is tightened until the desired distance between first bearing cone 22 and second bearing cone 14 is established. In this locked configuration, pressure is created against first bearing cone 22 to lock bearing cone 22 to shaft 32. Disc springs 18 are compressed together to generate an axial force that exerts frictional pressure between clearance ring 16 and the locking assembly (lock washer 12 and lock nut 10). This frictional pressure sufficiently locks second bearing cone 14 to shaft 32. Since first bearing cone 22 and second bearing cone 14 are secured tightly to shaft 32, shaft 32 will not be damaged by the rotating inner bore regions of both bearing cones. In a preferred embodiment, the disc spring assembly is configured to generate a disc pressure in Kg equal to, but not limited to, (diameter of shaft 32 at second bearing cone 14 in millimeters)×37.

It shall be appreciated that the tapered bearing system in the locked configuration maintains a temperature related clearance between first bearing cone 22 and second bearing cone 14 during a thermal expansion of shaft 32 or in the presence of vibrations generated from rotating components of the system. This allows materials of different thermal expansion coefficients to be combined in one rotating assembly. Notably, first bearing cone 22 and second bearing cone 14 remain locked to shaft 32, thereby minimizing shaft damage and component failure of the shaft and/or bearing system. At the same time, rotating components of the first and second bearing assemblies can rotate freely with shaft 32 without any excess friction. During the course of normal wear and tear of the bearing assemblies, lock nut 10 may be adjusted accordingly to enable the smooth operation of shaft 32 and the bearing system. A simple field maintenance adjustment would be to tighten the lock nut until no "play" is felt in the shaft.

It shall be appreciated that the components of the tapered bearing system described in several embodiments herein may comprise any known materials in the field and be of any color, size and/or dimensions. It shall be appreciated that the components of the tapered bearing system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A tapered roller bearing system for use with a rotating shaft secured within a housing, the bearing system being configured to remain locked to the shaft during thermal expansion and vibrations generated by the rotating shaft to minimize shaft damage and component failure, the bearing system comprising:
   a first bearing assembly comprising a first bearing cone operably connected to a tapered portion of the shaft;
   a tubular member disposed around the shaft and positioned against the first bearing assembly;
   a disc spring assembly operably connected to the shaft and positioned between the tubular member and a clearance ring;
   a second bearing assembly comprising a second bearing cone operably connected to the shaft and positioned against the clearance ring; and
   a locking assembly operably connected to the shaft and positioned against the second bearing assembly, wherein the locking assembly is configured to rotatably adjust to exert sufficient pressure to lock the first bearing cone to the shaft and enable the disc spring assembly to generate a compression force to exert frictional pressure between the clearance ring and the locking assembly to lock the second bearing cone to the shaft, wherein contact between the first bearing cone and the tapered portion of the shaft minimizes slippage of the first and second bearing cones on the shaft, thereby minimizing damage to the shaft.

2. The bearing system of claim 1, wherein the disc spring assembly comprises a first disc spring disposed around the shaft and positioned against the tubular member, a second disc spring disposed around the shaft and positioned between the first disc spring and the clearance ring.

3. The bearing system of claim 2, wherein the first disc spring and the second disc spring each comprises a concave side, wherein the concave side of the first disc spring is oriented to contact the concave side of the second disc spring.

4. The bearing system of claim 3, wherein the locking mechanism comprises a flat washer disposed around a threaded portion of the shaft and positioned against the second bearing assembly, and a castellated lock nut comprising interior threads configured to engage with the threaded portion of the shaft.

5. The bearing system of claim 4, wherein the first bearing assembly comprises a first set of bearing rollers disposed on the first bearing cone and a first bearing outer race disposed around the first set of bearing rollers.

6. The bearing system of claim 5, wherein the first bearing cone comprises a tapered bore configured to receive a tapered portion of the shaft.

7. The bearing system of claim 6, wherein the second bearing assembly comprises a second set of bearing rollers disposed on the second bearing cone and a second bearing outer race disposed around the second set of bearing rollers.

8. The bearing system of claim 7, wherein the second bearing cone comprises a cylindrical bore configured to receive a cylindrical portion of the shaft.

* * * * *